(12) United States Patent
Pore et al.

(10) Patent No.: US 11,268,908 B2
(45) Date of Patent: Mar. 8, 2022

(54) AIR DRYER CARTRIDGE AND DEVICE COMPRISING AN AIR DRYER CARTRIDGE

(71) Applicant: MANN+HUMMEL GmbH, Ludwigsburg (DE)

(72) Inventors: Prasad Pore, Ludwigsburg (DE); Markus Beylich, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 165 days.

(21) Appl. No.: 16/691,069

(22) Filed: Nov. 21, 2019

(65) Prior Publication Data

US 2020/0158654 A1 May 21, 2020

Related U.S. Application Data

(63) Continuation of application No. PCT/EP2018/063217, filed on May 18, 2018.

(30) Foreign Application Priority Data

May 23, 2017 (DE) .......................... 102017004945.9

(51) Int. Cl.
*G01N 21/81* (2006.01)
*G01N 21/3554* (2014.01)

(52) U.S. Cl.
CPC .......... *G01N 21/81* (2013.01); *G01N 21/3554* (2013.01)

(58) Field of Classification Search
CPC .... G01N 21/81; G01N 21/3554; G01N 21/35; G01N 19/10; G01N 22/04; G01N 5/045; B06T 17/221
(Continued)

(56) References Cited

U.S. PATENT DOCUMENTS 8,186,359 B2 * 5/2012 Ademe ................ A24D 3/0295
131/280
2008/0110337 A1 * 5/2008 Hoffman .............. B01D 53/261
95/3
(Continued)

FOREIGN PATENT DOCUMENTS

DE 102008034698 A1 6/2009
DE 102013201411 A1 7/2014
(Continued)

*Primary Examiner* — Hoa Q Pham (57) ABSTRACT

An air dryer cartridge for reducing moisture of air supplied to an electronics housing has a cartridge housing containing a drying agent through which air is guided. A sensor unit of an optical measuring system is provided for determining the moisture content of the drying agent. The cartridge has a light-permeable casing surface section so that an optical signal emitted from the optical measuring system can pass through the casing surface section. In the method for determining a moisture content of the drying agent of the air dryer cartridge, an optical signal from a sending module is emitted onto or through the drying agent and received by a receiving module where a measured value is determined. The moisture content is determined by comparing the measured value with a data set of measured value-specific values for moisture contents or by a calculation rule for moisture content based on measured value.

23 Claims, 4 Drawing Sheets

(58) Field of Classification Search
USPC ............... 356/432–440, 51, 445; 250/339.1,
250/339.11; 73/73; 62/474, 509; 95/3,
95/10; 96/26
See application file for complete search history.

(56) References Cited

U.S. PATENT DOCUMENTS

2011/0186661 A1* 8/2011 Bohm ..................... B02C 4/38
241/24.1
2013/0067661 A1   3/2013 Schwirian et al.

FOREIGN PATENT DOCUMENTS

| DE | 102013218700 | A1 | 3/2015 |
| DE | 102014211959 | A1 | 12/2015 |
| EP | 1920983 | A2 | 5/2008 |

* cited by examiner

AIR DRYER CARTRIDGE AND DEVICE COMPRISING AN AIR DRYER CARTRIDGE

CROSS-REFERENCE TO RELATED APPLICATIONS

This application is a continuation application of international application No. PCT/EP2018/063217, having an international filing date of 18 May 2018 and designating the United States, the international application claiming a priority date of 23 May 2017 based on prior filed German patent application No. 10 2017 004 945.9, the entire contents of the aforesaid international application and the aforesaid German patent application being incorporated herein by reference.

BACKGROUND OF THE INVENTION

The present invention concerns an air dryer cartridge and device comprising an air dryer cartridge, as well as a use of the air dryer cartridge and/or of the device, in particular in a battery housing of a vehicle, and further concerns a method for determining a moisture content.

In battery construction, in particular for use in vehicles, air dryer cartridges are currently utilized which dehumidify air in the housing interior. The battery takes up this air from the environment due to heating processes in operation of the battery. The air moisture condenses at battery parts upon cooling, which however is prevented by the dehumidification action of the air dryer cartridge.

Typically, the air dryer cartridge can be exchanged during servicing of the vehicle, e.g., in regular inspections. However, it may happen that the saturation of the drying agent in the air dryer cartridge is reached already prior to a scheduled service.

DE 10 2015 204 678 A1 discloses such an air dehumidification system. The air moisture of the drying agent is determined in this context by a weight sensor, i.e., gravimetrically.

DE 10 2014 015 188 A1 discloses a monitoring system of an air dryer cartridge on the basis of a capacitor with two measuring electrodes.

Moreover, DE 10 2008 034 698 A1 discloses an air dryer cartridge for a vehicle battery of a motor vehicle which comprises a hollow-cylindrical housing that comprises an air-permeable casing surface. In the housing, a bulk drying agent is provided which is mixed with a moisture-dependent color change agent so that, by means of a viewing glass at the housing, the color of the color change agent can be viewed in order to evaluate a moisture content. Disadvantageously, such an air dryer cartridge is not suitable for integration into an automated measured value detection system.

Finally, DE 10 2014 211 959 A1 discloses a drying system for a battery that comprises an air conveying device for providing an air flow into the battery housing, a filter, and a drying agent chamber. Moreover, a color indicator or moisture sensor for monitoring the moisture content of the drying agent is provided. The drying system is located outside of the battery housing so that the air can be supplied through a hose conduit to the battery housing.

Based on this prior art, it is the object of the present invention to enable a better possibility of monitoring the moisture content in an air dryer cartridge.

SUMMARY OF THE INVENTION

The present invention solves this object by an air dryer cartridge that comprises a component of an optical measuring system, namely a sensor unit, with which the moisture content of the drying agent can be determined, wherein the cartridge housing, at least in sections thereof, comprises a light-permeable casing surface section for passing through an optical signal emitted from a component of the optical measuring system.

The object is further solved by a device for determining a moisture level of an air dryer cartridge for installation at or in a housing, in particular an electronics housing, comprising:
  an air dryer cartridge for reducing the air moisture of air that can be supplied to a housing, wherein the air dryer cartridge comprises a cartridge housing through which air can be guided, and wherein a drying agent is arranged within the cartridge housing, and
  at least one component, fast with the housing, of an optical measuring system for determining the moisture content of the drying agent, wherein the optical measuring system is provided for emitting an optical signal which defines a beam path, and wherein the air dryer cartridge is arranged such relative to the optical measuring system that the air dryer cartridge is arranged in the beam path of the optical measuring system,
  wherein the cartridge housing, at least in sections thereof, comprises a light-permeable wall section for passing through an optical signal emitted from the optical measuring system.

An air dryer cartridge according to the invention for reducing the air moisture of air that can be supplied to an electronics housing comprises a cartridge housing. Air can be guided through the cartridge housing. Within the cartridge housing, a drying agent is arranged.

The drying agent can be embodied preferably as a solid drying agent. Further preferred, this solid drying agent can be in the form of bulk material comprising a plurality of drying agent grains in the cartridge housing. The terms drying agent grain, drying agent granule and/or drying agent bead are to be understood as synonyms.

An inorganic drying agent or a polymer, in particular a silica gel, can be used particularly preferred as drying agent. Advantageously, the drying agent can comprise in addition a color indicator with one or a plurality of color change points at different moisture contents.

Preferably, the cartridge housing can be embodied in a tubular shape and can comprise a casing surface, also referred to as tubular casing surface.

According to the invention, the air dryer cartridge comprises at least one component of an optical measuring system with which the moisture content of the drying agent can be determined. The optical measuring system in this variant of the invention is thus at least partially a component of the air dryer cartridge.

An optical measuring system can comprise inter alia a sensor unit, also referred to as measuring feeder, and an evaluating and/or display unit, also referred to as transducer or transmitter.

In a preferred embodiment of the invention, a sensor unit of the optical measuring system can be arranged in or at a casing surface of the cartridge housing.

The sensor unit of the optical measuring system in a further, also preferred embodiment variant can also be present at or in a grain of the drying agent. In an embodiment that is not in accordance with the invention, the sensor which is embedded in the drying agent grain can also be based on a non-optical principle, for example, inductive, capacitive, or conductivity-based.

In the aforementioned variants, only the sensor unit as component of the measuring system is a part of the air dryer cartridge. However, it is also possible that the entire measuring system is part of the air dryer cartridge.

An infrared measuring system, a UV-Vis measuring system, a color sensor and/or a turbidity sensor can be utilized particularly preferred as optical measuring system. A sensor is to be understood according to the invention as a measuring element or sensing element which converts an optical signal into a processible electrical signal. Chemical color indicators which generate a color change due to a change in moisture are no sensors in the meaning of the present application because they do not provide an electrical signal that can be tapped for processing. According to the invention, it would however be possible to process such a chemical color change (indicator reaction) with an opto-electronic measuring device that appears suitable, for example, a photocell, a color sensor, and the like.

A device according to the invention for determining a moisture content of an air dryer cartridge is provided for installation at or in a housing, in particular in an electronics housing. The device comprises an air dryer cartridge and an optical measuring system fast with the housing.

Fast with the housing means in this context that the optical measuring system or at least its sensor unit is fixed or arranged at or in the housing in which the air dryer cartridge is installed. In this context, the air dryer cartridge is preferably arranged separate from the optical measuring system, in particular from its individual components, in the housing.

The air dryer cartridge in this context is configured for reducing the air moisture of air, in particular for reducing the air moisture of air that can be supplied to an electronics housing, wherein the air dryer cartridge comprises a cartridge housing through which air can be guided and wherein a drying agent is arranged within the cartridge housing.

The optical measuring system fast with the housing serves for determining the moisture contents of the drying agent.

The optical measuring system is provided for emitting an optical signal which defines a beam path wherein the air dryer cartridge is arranged in such a way relative to the optical measuring system that the air dryer cartridge is arranged in the beam path of the optical measuring system.

In the device according to the invention, an infrared measuring system, a UV-Vis measuring system, a color sensor and/or a turbidity sensor can also be utilized particularly preferred as optical measuring system.

In this context, the infrared measuring system and/or the UV-Vis measuring system defines preferably a beam path which penetrates the medium. In contrast thereto, the beam path in case of a turbidity and/or color sensor is changed, e.g., the optical signal is reflected, diffracted and/or scattered. Accordingly, the beam path can thus have a straight course only in sections thereof, e.g., up to the point of impinging on the drying agent.

The constructive configuration of the air dryer cartridge according to the invention, aside from the arrangement of the optical measuring system, can be embodied in analogy to the air dryer cartridge of the device according to the invention.

By the combination of at least one component of the optical measuring system and of the drying agent in the air dryer cartridge according to the invention and/or in a device with the component of the optical measuring system and with the air dryer cartridge, the state of the drying agent can be monitored with regard to its moisture level, for example, in order to indicate that an exchange of the air dryer cartridge is necessary.

Advantageous embodiments of the invention are subject matter of the dependent claims.

The component of the measuring system, in particular the sensor unit, can be arranged at the cartridge housing, preferably at a casing surface section, in particular at a casing surface section of an inner wall side of the cartridge housing.

Alternatively or additionally, the component of the measuring system can be arranged at or in the drying agent, preferably at or in an individual drying agent grain of the drying agent.

In the following, some advantageous embodiments will be explained in more detail which can be used in the air dryer cartridge according to the invention but also in the device according to the invention.

The cartridge housing comprises, at least in sections thereof, a light-permeable wall section for passage of an optical signal which is emitted from a component of the optical measuring system. The light-permeable wall section can preferably be embodied also as an air-permeable wall section. The optical signal is emitted, for example, by a sending module of the optical measuring system.

In the context of the present invention, the term optical signal encompasses an emitted signal which is emitted by a sending module of an optical measuring system as well as the received signal which is detected by a receiving module after having passed through the drying agent, after having been reflected at the drying agent, after having been scattered by the drying agent, and the like.

The sensor unit of the optical measuring system however must not comprise mandatorily a sending module and a receiving module. For example, it is possible that the sensor unit is a sending module or receiving module which can be operated in a sending mode or a receiving mode.

The optical measuring system can comprise at least one color sensor, preferably a color sensor with a light source, for determining the spectral range of the drying agent as a function of the moisture content. As a light source or sending module for illuminating the drying agent, preferably one or a plurality of broadband light sources can be employed in the color sensor. It can be in the form of one or a plurality of LEDs. Preferably one or a plurality of photo diodes, particularly preferred with integrated color filters, can be employed as a detector or receiving module for the color sensor. The color filters can operate based on interference. The photo currents which are received by the detector can be converted into voltages, filtered as needed, and amplified as needed. For this purpose, a transimpedance amplifier can be utilized. By means of a computing unit of an evaluation unit of the color sensor, a digitalized value can be transferred into color coordinates and transformed into Lab color spaces. Finally, by means of the computing unit, a comparison of the actual color coordinates with tolerance values stored in a table and/or further comparative color coordinates can be carried out. Finally, the so-called color detection is realized.

Alternatively or additionally, the optical measuring system can comprise at least one sensor unit with a sending module for emitting an optical signal in the form of an emitted signal, in particular an infrared signal, to the drying agent and with a receiving module for receiving the optical signal as a received signal correlated with the emitted signal after its passage through the drying agent. The operating manner of this optical measuring system can be realized in analogy to an infrared spectrometer. This variant of the optical measuring system is advantageous because the individual sensor components are easily available and the measuring method is well established.

The cartridge housing can advantageously be of a tubular configuration and have a longitudinal axis A wherein the cartridge housing comprises an air-permeable casing surface section through which air, in particular in radial direction relative to the longitudinal axis A, can flow to the drying agent. In this way, an optimal air feed to the drying agent is achieved.

The cartridge housing can advantageously also be embodied as a flexible housing, preferably a screen fabric, particularly preferred embodied of metal material and/or polymer material, or the cartridge housing can comprise such a material at least in sections thereof.

Signal export out of the cartridge housing of a measured signal, in particular of a current-equivalent and/or voltage-equivalent measured signal, can be realized by one or a plurality of energy and/or data line(s), in particular at a terminal end face. Other locations of exporting the aforementioned data/energy flows are possible, for example, at a casing surface.

The sensor unit may comprise in addition a signal processing unit wherein a measured signal which can be tapped or detected at the sensor unit is a voltage-equivalent and/or current-equivalent measured signal which can be determined from the optical signal, in particular from the emitted and/or the received signal, by the signal processing unit. In this way, the measured signal can also be forwarded to an evaluation or display unit.

For easy export of the measured signal out of the cartridge housing, the sensor unit can comprise a communication interface for detachable contacting with a display and/or evaluation unit or for wireless communication with the display and/or evaluation unit, wherein the measured signal can be exported out of the cartridge housing through the communication interface. The communication interface can be connected detectably to a communication interface at the housing, e.g., the electronics housing, e.g. in the form of a plug connection. However, it is also possible to realize contacting of the communication interfaces without their mechanical connection, e.g., by contacting contact elements on a circuit board, but also a wireless or contactless communication between the aforementioned communication interfaces, e.g., by means of a radio communication, is possible.

Moreover, the air dryer cartridge, in particular the air dryer cartridge according to the invention, may comprise an energy supply unit for energy supply of the sensor unit.

The air dryer cartridge of the device according to the invention is advantageously exchangeably arranged in the device in this context.

In contrast thereto, the optical measuring system, preferably the sensor unit, can be fixedly arranged in the device and in particular also in the housing in which the device is arranged.

The use of the air dryer cartridge according to the invention and/or of the device according to the invention for air dehumidification of the air contained in a battery housing, in particular of a lithium ion battery, of a vehicle is moreover also in accordance with the invention.

A method according to the invention for determining the moisture content of the drying agent of an air dryer cartridge according to the invention or of an air dryer cartridge of a device according to the invention comprises the following steps:
  a. emitting an optical signal, in particular as emitted signal, by a sending module onto or through the drying agent;
  b. receiving the optical signal, in particular as a received signal, by a receiving module with determination of a measured value;
  c. determining the moisture content of the drying agent by comparison of the measured value with a data set comprising measured value-specific values for different moisture contents of the drying agent and/or by use of a calculation rule concerning the moisture content of the drying agent as a function of the measured value.

Preferably, a comparison of the measured emitted signal with the received signal can be realized in step b.

The determination of the moisture content can be realized in various ways. A variant is the comparison based on existing data. A further variant is the application of a calculation rule by means of the measured value for determining the moisture content.

The measured value-specific values can advantageously encompass extinction values, transmission values and/or wavelengths of the visible spectral range for different moisture levels of the drying agent.

The method according to the invention can advantageously be performed in intervals or discontinuously. For example, a measurement of the moisture content can be performed e.g. only upon starting and shutting down the vehicle.

BRIEF DESCRIPTION OF THE DRAWINGS

In the following, the invention will be explained in more detail based on a plurality of embodiments with the aid of the attached drawings. The drawings contain in this context also features which, taken individually, can be combined in a self-evident manner with the other illustrated or further non-illustrated embodiments. In this context, the embodiments as a whole are not to be understood as limiting in any way the claimed scope of protection of the present invention.

DESCRIPTION OF PREFERRED EMBODIMENTS

High voltage batteries are used, for example, for driving electric vehicles, hybrid vehicles or plug-in hybrid vehicles, in particular motor vehicles.

A plurality of high voltage batteries are based on lithium ion batteries which must be protected from moisture. Since batteries typically heat up in operation, air moisture can penetrate into the interior of the battery housing at interfaces, e.g., in connecting regions of battery housing parts. Upon cooling of the battery, this air moisture would deposit as condensed water on components in the interior of the battery housing, which leads to damage or decrease in performance of the battery in the long run.

For this reason, for dehumidification of air in the interior of the battery housing, air dryer cartridges are used whose object is to lower the air moisture of the air contained in the interior of the battery housing and/or of the air supplied to the interior of the battery housing so that, upon cooling, no condensation of moisture at the internally positioned battery components occurs.

The service life of the air dryer cartridge depends in this context significantly on the moisture content of a drying agent which is contained in the air dryer cartridge.

Figure 1A:
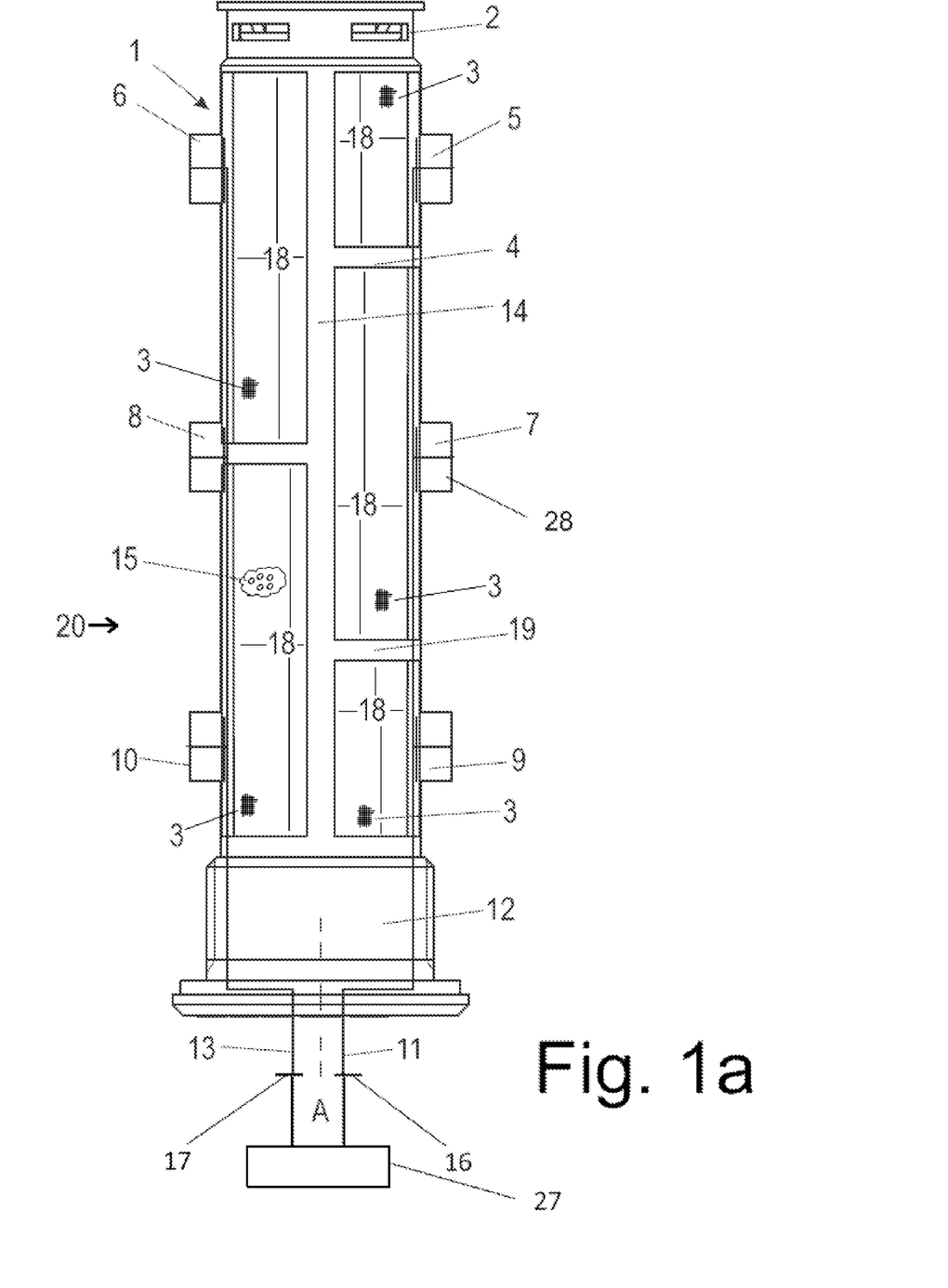
FIG. 1*a* shows a schematic illustration of a first embodiment of an air dryer cartridge according to the invention.

FIG. 1a shows a first exemplary embodiment of an air dryer cartridge 1 according to the invention. The air dryer cartridge 1 comprises a tubular cartridge housing 20 with a longitudinal axis A. The cartridge housing 20, at least in sections thereof, in particular along the tubular casing 3 of the tubular cartridge housing 20, can be comprised of an air-permeable material, for example, a mesh material, particularly preferred of a metal, in particular of stainless steel, or of a polymer material.

For stabilization of the air-permeable material, the cartridge housing 20 may additionally comprise a support structure 19, preferably of plastic material, particularly preferred of a thermoplastic material. The support structure 19 comprises, for example, longitudinal stays 14, which extend parallel to the longitudinal axis A of the cartridge housing 20, and curved transverse stays 4, which are each arranged on a cross section plane, extending perpendicular to the longitudinal axis A, at a spacing to each other. The support structure 19 frames in this context the air-permeable material and stabilizes the latter.

Two neighboring longitudinal stays 14 and two neighboring transverse stays 4 define a casing surface section 18 as a window. Within this window, the mesh material and/or another transparent material is arranged which permits passage of an optical signal through the window.

The air dryer cartridge 1 comprises at least one terminal connecting element 12 arranged at the cartridge housing 20, for example, a flange, a cutout, a projection, a bayonet closure element or a thread for connecting to a connecting socket of a housing, in particular a battery housing. The air dryer cartridge 1 can be closed at the end in the region of the connecting element 12 and can comprise a screw head with a tool engagement element for screwing the air dryer cartridge 1 into the aforementioned connecting socket of the housing.

Sealing elements, e.g., sealing rings, can be additionally provided at the terminal connecting element 12.

Optionally, at the second end of the cartridge housing 20, a second connecting element 2 can be arranged. By means of the second connecting element 2, the cartridge 1 can be supported mechanically at a further fastening point within the housing or, through it, a further cartridge 1 can also be joined in order to obtain essentially a serial connection of cartridges 1.

The inflow of the air to the cartridge housing 20 and the outflow of the dehumidified air can be realized from and in radial direction relative to the cartridge housing 20, in particular also through the aforementioned casing surface section 18.

In the upper third, in the central third, and in the lower third of the cartridge housing 20, a sending module 5, 7, and 9 for emitting an optical signal is arranged, respectively. The sending module 5, 7, and 9 is associated in this context with the air dryer cartridge 20 according to the invention and is part of an optical measuring system.

The optical signal can have preferably a wavelength between 1 nm to $10^6$ nm, preferably between 380 nm to $10^6$ nm, in particular between 650 nm to $10^5$ nm.

The sending modules 5, 7, and 9 have associated therewith, respectively, a receiving module 6, 8, 10 at the respective cross section plane perpendicular to the longitudinal axis A. The receiving module 6, 8, 10 can be arranged, for example, at the diametrically opposed side of the respective sending module 5, 7, 9 and is also part of the air dryer cartridge 1.

In FIG. 1a, the sending and receiving modules are fastened at the cartridge housing 20.

In the interior of the cartridge housing 20, a drying agent 15 for dehumidification of air is arranged. The drying agent 15 is illustrated schematically in FIGS. 1a, 1b, and 2 via an imaginary cutout in the mesh casing 3.

In this context, the respective sending module 5, 7, 9 is arranged in the casing surface section 18 or arranged such relative to the casing surface section 18 that the optical signal of the sending module 5, 7, 9 can pass through the window. The optical signal impinges then on the drying agent 15 and can finally be received by a receiving module 6, 8, 10 and evaluated. For this purpose, the receiving module is arranged in the same manner at a further casing surface section of the cartridge housing 20.

The drying agent 15, which in the context of the present invention is also referred to as desiccating agent, can remove the water from the air preferably by chemical bonding, by embedding in a crystal structure of the material and/or by adsorption.

A silica gel can be preferably used as drying agent.

A sending module 5, 7, 9 and a receiving module 6, 8, 10 correlated with the sending module, respectively, form in the context of the present invention a sensor unit of an optical measuring system.

The optical measuring system of FIG. 1 comprises, as illustrated, three sensor units 5-6, 7-8, 9-10; however, it may comprise only one or two sensor units.

The optical measuring system is based in this context preferably on an infrared measurement.

In this context, the optical measuring system can detect the transmission and/or extinction of the optical signal, in particular of the infrared signal, which changes as a function of the moisture level of the drying agent 15.

From infrared spectroscopy, it is known that water molecules generate broad bands in an IR spectrum. Accordingly, it is inter alia also possible to determine, based on the surface area of the $H_2O$ band in an IR spectrum, the amount of the water proportion in a material. A comparable evaluation can be the basis of the infrared measurement of the drying agent 15.

When the transmission and/or extinction reaches a certain limit value, the drying agent 15 is considered saturated and must be exchanged.

In addition to the comparison based on a single limit value, a data set with a plurality of transmission values and/or extinction values for a plurality of moisture contents can also be stored in a data storage and the moisture content can be determined based on the detected measured values. Accordingly, it is possible to provide the user with a prediction of the presumable service life of the air dryer cartridge 1 (predictive maintenance).

The energy supply and/or data transmission of the sending module 5, 7, 9 is realized by a first energy and/or data line 11. The energy and/or data supply of the receiving modules 6, 8, 10 is realized by a second energy and/or data line 13. The two energy and/or data lines 11 and 13 end in a respective energy and/or communication interface 16, 17 or in a common energy and/or communication interface which is embodied detachably. The energy and/or communication interface can be a part of a plug connection, i.e., plug or socket, or via a metallic contacting point which, for example, can be arranged on a circuit board. This enables, on the one hand, the data transmission to an internal or external display and/or evaluation unit 27, which is correlated with the air dryer cartridge in FIG. 1a, but can also be correlated with a component of the vehicle, e.g., the battery housing.

The energy and/or data lines 11 and 13 exit in FIG. 1a in the region of a terminal end face from the cartridge housing 20 so that the evaluation unit 27 can be connected to the lines in an uncomplicated manner, even without the communication interfaces 16, 17, as needed.

As an alternative to the energy and/or data lines 11 and 13, it is however also possible to provide a communication interface, e.g., a radio module, for wireless data transmission of the data to a display and/or evaluation unit, not illustrated.

The detachability of the communication interface is advantageous for an uncomplicated exchangeability of the air dryer cartridge in a housing, in case the evaluation unit is installed in the housing. This may be the case in the embodiment variants of an air dryer cartridge illustrated in FIGS. 3a to 3c with at least one optical sensor unit of an optical measuring system arranged in the cartridge housing.

The first and/or second energy and/or data line 11, 13 is arranged, respectively, along a longitudinal stay 14 of the support structure 19 which protects the respective energy and/or data line 11, 13 from mechanical damage.

Due to the distribution of two, or in the present case of three, sensor units at different positions along the longitudinal axis A, the moisture absorption of the drying agent 15 along the longitudinal axis A can be determined. For example, the drying agent in some regions of the air dryer cartridge 1 can already have reached a higher saturation level than in other regions of the air dryer cartridge 1. By the distribution of a plurality of sensor units at different positions along the longitudinal axis A, it is advantageously avoided that individual particles of the drying agent with a locally higher moisture content already trigger a warning regarding exchange of the air dryer cartridge 1. Conversely, it is also prevented that a locally reduced moisture content gives the appearance that the absorption capacity for air moisture by the air dryer cartridge 1 is still adequate.

Since it is possible but also probable that the saturation of the drying agent 15 which is used preferably in granular or coarse-grain form, in particular as bulk material, is at different levels at different locations of the air dryer cartridge 1, the measurement at a plurality of positions provides for a higher precision with regard to the evaluation of the average moisture content of the drying agent 15 in the entire air dryer cartridge 1.

Figure 1B:
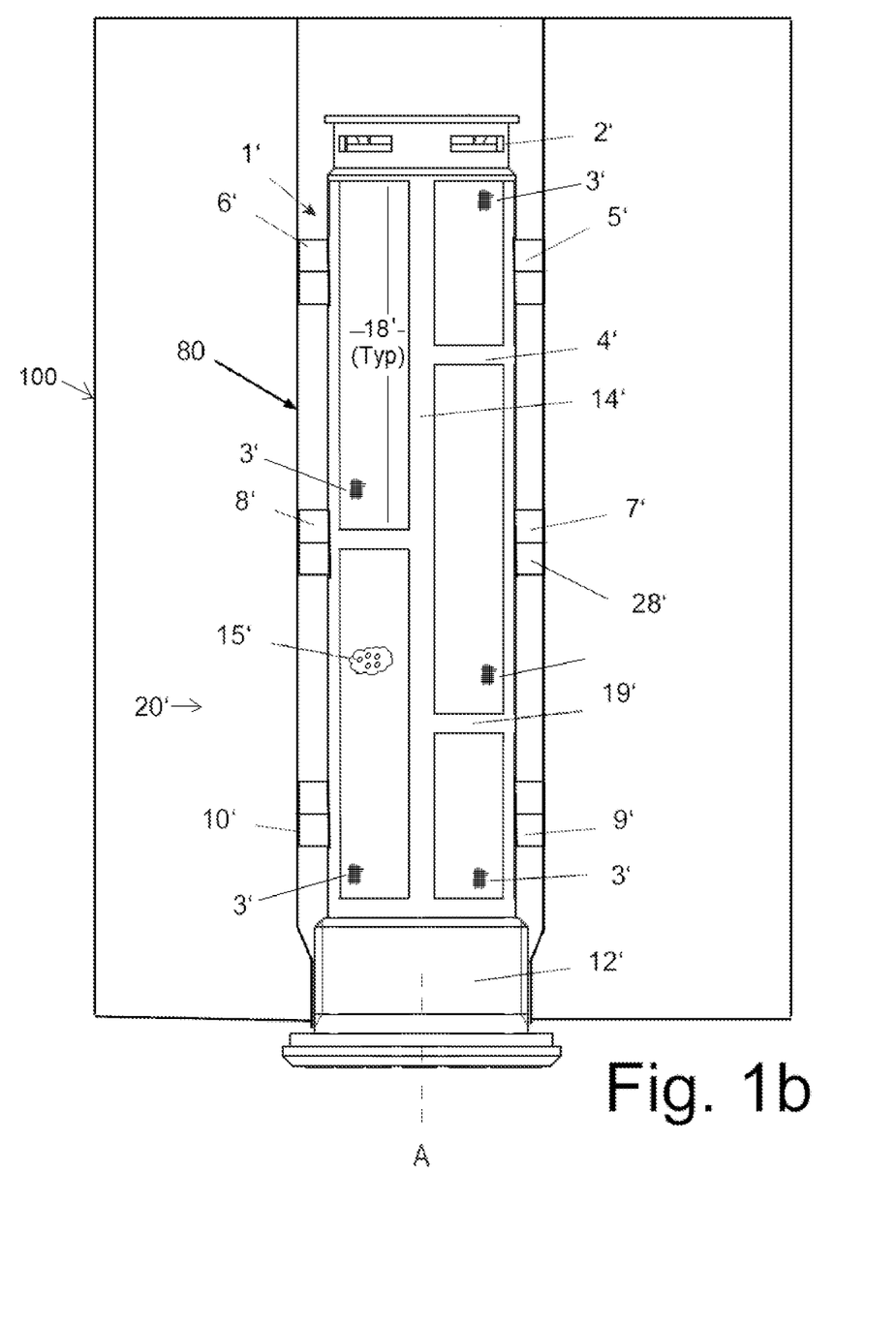
FIG. 1*b* shows a schematic illustration of a first embodiment of a device according to the invention with an air dryer cartridge.

FIG. 1b shows a second variant of the invention in which a device 80 with an air dryer cartridge 1' is illustrated. The air dryer cartridge 1' comprises, aside from the arrangement of the sending and/or receiving modules 5'-10' and their energy and/or data line, an analogous configuration relative to the air dryer cartridge 1 of FIG. 1a. The same holds true for the drying agent 15' which is embodied in analogy to the drying agent 15. The energy and/or data lines are presently not illustrated; they can however be arranged in the device 80 outside of the air dryer cartridge 1=.

In the upper third, in the central third, and in the lower third of the cartridge housing 20', a sending module 5', 7', and 9' for emitting an optical signal is arranged, respectively. The sending modules 5', 7', and 9' are correlated in this context with the device 80 according to the invention and are part of an optical measuring system.

A receiving module 6', 8', 10' is assigned, respectively, to the sending modules 5', 7', and 9' at the respective cross section plane perpendicular to the longitudinal axis A. The receiving module 6', 8=, 10= can be arranged, for example, at the diametrically opposed side of the respective sending module 5', 7', 9' and is also part of the device 80 but not of the air dryer cartridge 1=.

The sending and receiving modules are arranged in FIG. 1b very close to a wall of the cartridge housing 20' but are not connected to the cartridge housing so that the air dryer cartridge 1=is arranged in the device 80 so as to be exchangeable separate from the sensor units 5-6', 7-8', 9-10'.

The optical measuring system or at least components thereof, in particular the sending and receiving modules, can be arranged rigidly in the device 80 or can be arranged so as to be exchangeable separate from the air dryer cartridge 1 in the device 80.

Furthermore, the device 80 is connected to a housing 100. The housing 100 is illustrated in FIG. 1b in a greatly simplified manner; the housing can be an electronics housing. A housing 100 can also be arranged analogously in the FIGS. 1a and 2.

In a further embodiment variant, mesh material of the cartridge housing can be designed as a closed mesh bag. The housing structure 19 can be of a multi-part configuration and, by detaching the parts of the housing structure 19, the mesh bag can be removed together with the drying agent 15 from the housing structure 19. In this way, the mesh bag which is preferably comprised of a metal mesh, can be subjected together with the drying agent 15 to a recycling step, in particular a heat treatment, in which the drying agent is regenerated and releases the absorbed water molecules again. Several drying agents are known which can be regenerated by a heat treatment. Due to the separation possibility between the mesh bag and the housing structure, the plastic material of the housing structure is not loaded thermally in this recycling step. However, it is also possible to subject the entire air dryer cartridge 1 to the aforementioned recycling step without separating the mesh material from the housing structure 19.

Figure 2:
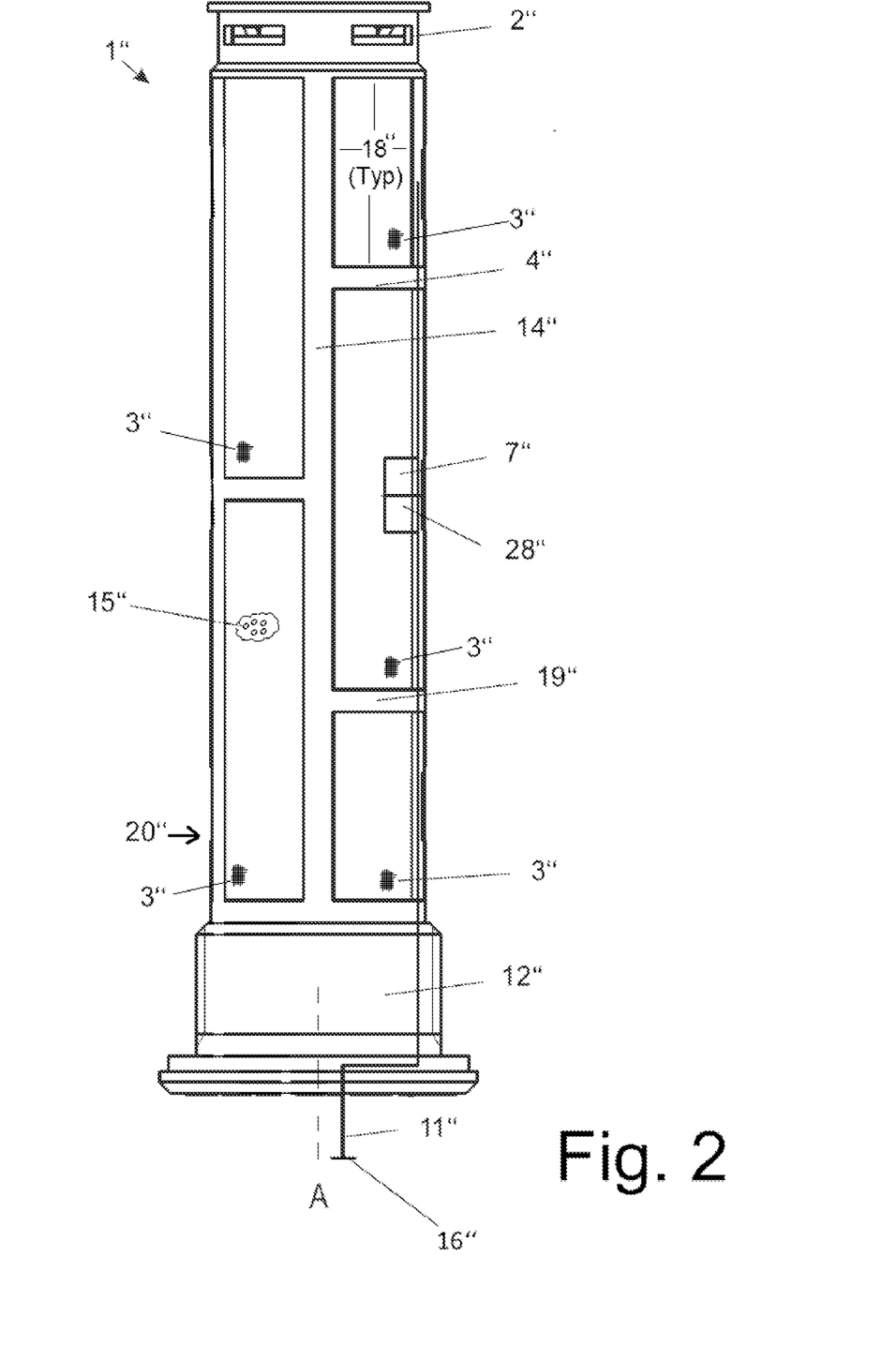
FIG. 2 shows a schematic illustration of a second embodiment of an air dryer cartridge according to the invention.

FIG. 2 shows an embodiment of an air dryer cartridge 1" according to the invention with a substantially analogous configuration relative to FIG. 1a. The air dryer cartridge 1" differs however from the air dryer cartridge 1 of FIG. 1a in that, instead of the sensor units comprising each a receiving module and a sending module, only one sensor unit 7" in the form of a so-called color sensor is used. The color sensor is fixedly connected to the cartridge wall, here within the cartridge housing 20. Thus, the color sensor is part of the air filter cartridge 1". Color sensors are known in general; they detect the color of a surface. In this context, the sensors emit light, for example, red, green, blue, onto the objects to be tested and calculate the color value proportions based on the reflected radiation. Subsequently, a comparison of the detected color value proportions with data sets stored in a data storage with regard to reference color values, which have correlated therewith certain saturation levels of the drying agent in the present case, is carried out.

Also, for the sensor unit 7" only one energy and/or data line 16" is required which is arranged in the cartridge housing and at the end, in analogy to FIG. 1a, is extending away from an end face out of the cartridge housing 20".

Based on the measured color value proportions, the saturation level of the drying agent with respect to moisture can thus be determined.

The drying agent 15" of the air dryer cartridge 1" of FIG. 2 can be embodied in analogy to the drying agent 15, 15' of FIGS. 1a and 1b.

The drying agent 15 or 15' in itself can already produce a color change which can be detected. Alternatively or in addition, the drying agent can also comprise an indicator dye which indicates the level of water absorption. Typical indicator dyes which exhibit a different color depending on the water content are, for example, cobalt salts, such as e.g. cobalt(II) chloride, or copper salts, e.g., copper sulfate.

In a preferred variant of a device according to the invention, the sending and/or the receiving module of FIGS. 1a and 1b as well as the color sensor of FIG. 2 can alternatively also be arranged as an optical measuring system separate from an air dryer cartridge.

In the aforementioned variant of a device according to the invention, the air dryer cartridge can be arranged exchangeably in a battery housing wherein sensor units of the optical measuring system are arranged fixedly or also exchangeably in the battery housing. The air dryer cartridge and the optical measuring system can form in this context, for example, by means of form fit or friction connection, a constructive unit, wherein these two components of the constructive unit are detachable from each other. Appropriate coupling means, e.g., locking means or a bayonet closure, are generally known. The device according to the invention can be inserted as a constructive unit into the battery housing, or the air dryer cartridge and the optical measuring device can be secured separate from each other in the battery housing.

It is however also possible that the sensor unit or the sensor units as so-called embedded sensor elements are arranged in the drying agent or in a material of the cartridge housing 20.

In FIGS. 1a, 1b, and 2, a signal processing unit 28, 28', 28" is arranged at each sensor unit. It serves for conversion of an optical signal that is tapped at one or the plurality of sensor units into a voltage-equivalent and/or current equivalent measured signal. Of course, each sending and/or receiving module may comprise such a signal processing unit.

The air dryer cartridge of FIGS. 1a, 1b, and 2 can also comprise an energy supply unit, not illustrated, for energy supply of the sensor unit or sensor units.

Figure 3A:
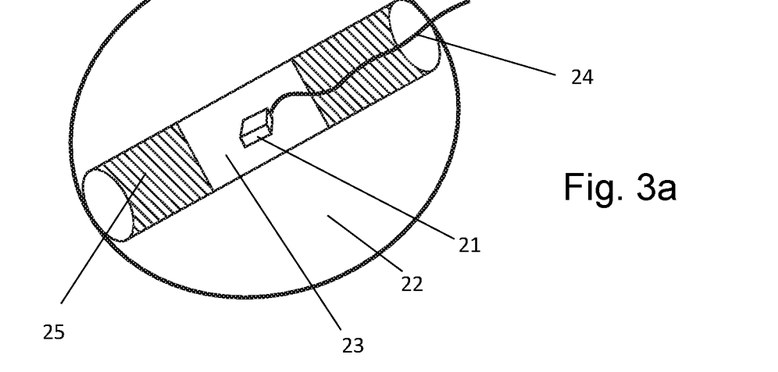
FIGS. 3*a*-3*c* show several schematically illustrated sensor units for arrangement in a third embodiment of an air dryer cartridge according to the invention.

FIG. 3a shows a further variant of the detection of the drying agent saturation by an optical measuring system, for example, by an already described color sensor as sensor unit, in particular in microelectro-mechanical construction, as a so-called MEMS chip with a space requirement of less than 20 mm; preferably less than 10 mm.

In this context, the miniaturized sensor unit 21 is introduced into a drying agent grain 22 or drying agent granule which, as needed, comprises in addition a color indicator for indicating the water saturation level.

In FIG. 3a, a channel 23 is arranged in the drying agent grain 22 for arrangement of the sensor unit of the optical measuring system. Within the channel 23, the sensor unit 21 is arranged. The channel 23 is closed off terminally at both sides with a sealing material 25. At least one data and/or signal line 24 for data exchange and/or for energy supply extends from the sensor unit 21 through the sealing material to the exterior. The sensor unit 21 within the channel 23 can determine by optical measurement, for example, based on the color change of the drying agent, the moisture level of the drying agent grain.

Figure 3B:
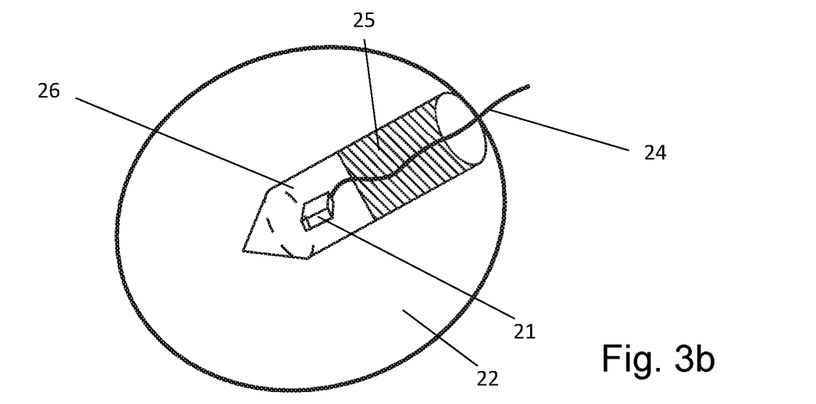
Figure 3C:
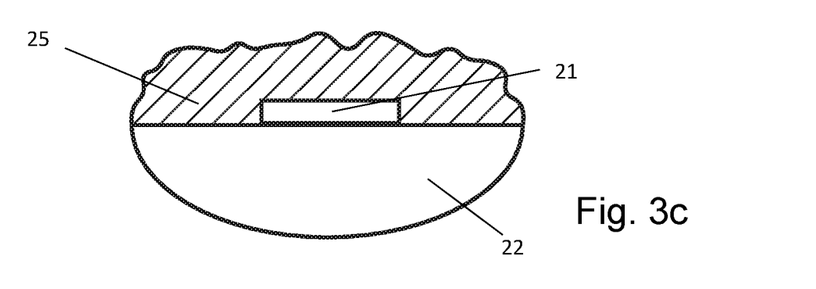

FIG. 3b shows a similar arrangement of the sensor unit of the optical measuring system, however within a blind bore 26 which is introduced into the drying agent grain.

It is alternatively also possible to arrange the sensor unit 21 at the surface of the drying agent grain or in the channel 23 or in the blind bore 26 and to embed the sensor unit subsequently in the sealing material 25.

The miniaturized sensor unit 21 can determine the moisture content of the respective individual drying agent grain 22. This measurement is very precise with regard to the moisture level of the respective drying agent grain 22 due to the minimal spacing relative to the surface of the drying agent but has disadvantages with regard to determining an average moisture level of all drying agent grains in an air dryer cartridge 1.

Furthermore, the arrangement of the sensor unit 21 in a drying agent grain 22 is particularly advantageous because the sensor unit 21 in this way is protected better in regard to temperature and environmental influences in a recycling process under heat action and under extreme storage conditions.

The data line between the aforementioned sensor units of FIGS. 1a, 1b, 2, and 3a-3c and an evaluation unit can optionally also be realized by wireless transmission, e.g., by radio transmission.

The regeneration of the drying agent for the aforementioned embodiment variants can be realized by heat treatment and can be checked by optical measurement or by gravimetric measurement.

The measurement for determining the moisture level of the drying agent in the present invention can be realized preferably in intervals or discontinuously in order to ensure in this way an energy-efficient operation of the optical measuring system.

The air dryer cartridge 1 illustrated in the Figures has a substantially cylindrical shape. However, the invention is not limited thereto; instead, configurations are conceivable in which the air dryer cartridge 1 has a prism shape, in particular with a polygonal base surface, or embodiments in which the air dryer cartridge 1 has a flexible bendable envelope, for example, in the form of an air-permeable and light-permeable material.

What is claimed is:

1. An air dryer cartridge for reducing air moisture of air that can be supplied to an electronics housing, the air dryer cartridge comprising:
   a tubular cartridge housing through which air can be guided, the tubular cartridge housing surrounding a longitudinal axis (A) passing through an interior of the tubular cartridge housing, the tubular cartridge housing comprising:
      a support structure forming a plurality of windows opening into the interior of the tubular cartridge;
      a casing of an air permeable mesh arranged in and covering the plurality of windows;
   a drying agent for dehumidification of the air is arranged in the interior of the tubular cartridge housing;
   an optical measuring system detecting a proportion of water in the drying agent, comprising:
      an individual granule or a grain of drying agent having a hole formed into an interior of the individual drying agent granule or a grain;
      wherein the individual granule or a grain of drying agent includes a color indicator responsive to a water saturation level of the individual granule or grain of drying agent, as indicative of a water saturation level of the drying agent in the tubular cartridge housing;
      a color sensor unit arranged in the hole in the interior of the individual drying agent granule or a grain;
      wherein the color sensor comprises a light source;
      wherein the color sensor unit is configured to determine a spectral range of the individual granule or a grain as a function of the moisture content of the drying agent in the tubular cartridge housing;
      wherein the optical measuring system detects the water saturation level of the drying agent by a color change of the color indicator;

wherein the hole in the single granule or a grain of drying agent is closed off by a sealing material;

wherein at least one data or signal line runs through the sealing material from the color sensor unit to an exterior of the single granule or a grain of drying agent.

2. The air dryer cartridge according to claim 1, further comprising:

an evaluation and/or display unit configured to process and/or display a measured signal of the sensor unit;

an energy supply unit for energy supply of the sensor unit and of the evaluation and/or display unit configured to process and/or display a measured signal of the sensor unit.

3. The air dryer cartridge according to claim 1, wherein the air permeable mesh of the casing is a metal mesh or polymer mesh.

4. A device for determining a moisture content of an air dryer cartridge for installation at or in a housing, the device comprising:

a tubular air dryer cartridge wherein the tubular air dryer cartridge comprises:

a tubular cartridge housing through which air can be guided, the tubular cartridge housing surrounding a longitudinal axis (A) passing through an interior of the tubular cartridge housing, the tubular cartridge housing comprising:

a cartridge housing outer wall having a first axial end and a second axial end, the housing outer wall formed by:

a plurality of longitudinal support stays, spaced apart circumferentially about the tubular housing wall and extending axially between the first and the second axial ends;

a plurality of curved transverse stays, extending circumferentially about the tubular housing wall and extending in a transverse direction relative to the plurality of longitudinal support stays and joined to one or more of the plurality of longitudinal support stays;

wherein spacing between neighboring longitudinal stays and neighboring transverse stays form a plurality of windows;

a casing of an air and light permeable mesh arranged in and covering the plurality of windows;

wherein the air and light permeable mesh of the casing in the plurality of windows allows light and air to enter or exit the interior of the tubular cartridge housing through the plurality of windows;

wherein a drying agent for dehumidification of the air is arranged within the interior of the tubular cartridge housing;

an optical measuring system configured to determine the moisture content of the drying agent and comprising at least one component, fast with the housing, wherein the optical measuring system is configured to emit an optical signal defining a beam path;

wherein the tubular air dryer cartridge is arranged in the beam path of the optical measuring system;

wherein the optical signal emitted from the optical measuring system passes through at least one of the plurality of windows to detect a moisture content of the drying agent.

5. The device according to claim 4, wherein the air dryer cartridge is arranged exchangeably in the device.

6. The device according to claim 4, wherein the optical measuring system comprises a color sensor configured to determine a spectral range of the drying agent as a function of the moisture content of the drying agent.

7. The device according to claim 6, wherein the color sensor comprises a light source.

8. The device according to claim 4, wherein the optical measuring system comprises a sensor unit comprising a sending module configured to emit an optical signal as an emitted signal to the drying agent and further comprising a receiving module configured to receive an optical signal as a received signal correlated with the emitted signal after the emitted signal has passed through the drying agent.

9. The device according to claim 8, wherein the sending module emits an infrared signal.

10. The device according to claim 4, configured to dehumidify air contained in a battery housing of a vehicle.

11. A method for determining a moisture content of a drying agent of an air dryer cartridge of the device according to claim 4, the method comprising:

emitting an optical signal from a sending module onto or through a drying agent;

receiving the optical signal by a receiving module and determining a measured value; and determining the moisture content of the drying agent by comparing the measured value with a data set comprising measured value-specific values for different moisture contents of the drying agent and/or by using a calculation rule concerning the moisture content of the drying agent as a function of the measured value.

12. The method according to claim 11, wherein the measured value-specific values for different moisture contents of the drying agent comprise extinction values, transmission values, and wavelengths of the visible spectral range for different moisture contents of the drying agent.

13. The method according to claim 11, further comprising performing the method in intervals or discontinuously.

14. The device according to claim 4, wherein the air and light permeable mesh of the casing is a metal mesh or polymer mesh.

15. An air dryer cartridge for reducing air moisture of air that can be supplied to an electronics housing, the air dryer cartridge comprising:

a tubular cartridge housing through which air can be guided, the tubular cartridge housing surrounding a longitudinal axis (A) passing through an interior of the tubular cartridge housing tubular cartridge housing comprising:

a housing outer wall having a first axial end and a second axial end, the tubular housing outer wall formed by:

a plurality of longitudinal support stays, spaced apart circumferentially about the tubular housing wall and extending axially between the first and the second axial ends;

a plurality of curved transverse stays, extending circumferentially about the tubular housing wall and extending in a transverse direction relative to the plurality of longitudinal support stays and joined to one or more of the plurality of longitudinal support stays;

wherein spacing between neighboring longitudinal stays and neighboring transverse stays form a plurality of windows;

a casing of an air and light permeable mesh arranged in and covering the plurality of windows;

wherein the air and light permeable mesh of the casing in the plurality of windows allows light and air to enter or exit the interior of the tubular cartridge housing through the plurality of windows;

a drying agent for dehumidification of the air is arranged within the interior of the tubular cartridge housing;

an optical measuring system detecting a proportion of water in the drying agent, comprising:

at least one infrared sending module, arranged on the tubular housing outer wall and each positioned at a window of the plurality of windows, the at least one infrared sending module emitting an infrared optical signal as an emitted infrared signal to the drying agent;

at least one infrared receiving module, arranged on the tubular housing outer wall and each positioned at a window of the plurality of windows, the at least one infrared receiving module receiving the infrared optical signal after the emitted infrared signal has passed through the drying agent;

wherein the at least one infrared sending module and the at least one infrared receiving module are arranged on a respective cross section plane perpendicular to the longitudinal axis (A);

wherein the at least one infrared sending module and the at least one infrared receiving module are arranged on a respective cross section plane perpendicular to the longitudinal axis (A) at opposing sides of the tubular housing outer wall such that the infrared optical signal passes through the drying agent to reach the at least one infrared receiving module;

wherein the optical measuring system detects an amount of transmission or extinction of a received infrared optical signal to detect moisture level or saturation in the drying agent to detect when the drying agent needs to be changed.

16. The air dryer cartridge according to claim 15, wherein the sensor unit comprises
a signal processing unit,
wherein a measured signal tapped at the sensor unit is a voltage-equivalent and/or current-equivalent measured signal which is determined from the emitted infrared signal and/or received infrared signal by the signal processing unit.

17. The air dryer cartridge according to claim 15, wherein the sensor unit comprises
a signal processing unit,
wherein a measured signal tapped at the sensor unit is a voltage-equivalent and/or current-equivalent measured signal which is determined from the optical signal by the signal processing unit.

18. The air dryer cartridge according to claim 15, wherein the sensor unit comprises
a communication interface configured to detachably contact a display and/or evaluation unit or configured to provide wireless communication with the display and/or evaluation unit,
wherein the communication interface is configured to enable export of a measured signal of the sensor unit out of the cartridge housing.

19. The air dryer cartridge according to claim 18, further comprising
an energy supply unit for energy supply of the sensor unit and/or of the evaluation and/or display unit configured to process and/or display the measured signal.

20. The air dryer cartridge according to claim 15, wherein the sensor unit comprises one or a plurality of energy and/or data lines extending within the cartridge housing and exiting at a terminal end face of the cartridge housing from the cartridge housing and configured to enable export of a voltage-equivalent and/or current-equivalent measured signal of the sensor unit out of the cartridge housing.

21. The air dryer cartridge according to claim 15, further comprising:
an evaluation and/or display unit configured to process and/or display a measured signal of the sensor unit;
an energy supply unit for energy supply of the evaluation and/or display unit configured to process and/or display a measured signal of the sensor unit.

22. The air dryer cartridge according to claim 15, configured to dehumidify air contained in a battery housing of a vehicle.

23. The air dryer cartridge according to claim 15, wherein the air and light permeable mesh of the casing is a metal mesh or polymer mesh.

\* \* \* \* \*